(12) United States Patent
Lee et al.

(10) Patent No.: US 12,081,868 B2
(45) Date of Patent: Sep. 3, 2024

(54) ALIGNING OPTICAL COMPONENTS ALONG A PREDETERMINED REFERENCE OPTICAL PATH

(71) Applicant: ASMPT SINGAPORE PTE. LTD., Singapore (SG)

(72) Inventors: Man Yip Lee, Hong Kong (HK); Fan Leuk Lai, Hong Kong (HK); Po Lam Au, Hong Kong (HK)

(73) Assignee: ASMPT SINGAPORE PTE. LTD., Singapore (SG)

( * ) Notice: Subject to any disclaimer, the term of this patent is extended or adjusted under 35 U.S.C. 154(b) by 575 days.

(21) Appl. No.: 17/412,406

(22) Filed: Aug. 26, 2021

(65) Prior Publication Data

US 2023/0062423 A1    Mar. 2, 2023

(51) Int. Cl.
*G01M 11/08*    (2006.01)
*H04N 23/68*    (2023.01)

(52) U.S. Cl.
CPC ......... *H04N 23/6811* (2023.01); *G01M 11/08* (2013.01)

(58) Field of Classification Search
CPC ........................... H04N 23/6811; G01M 11/08
See application file for complete search history.

(56) References Cited

U.S. PATENT DOCUMENTS

| | | | |
|---|---|---|---|
| 2008/0316350 A1* | 12/2008 | Gottwald | H04N 23/54 348/340 |
| 2013/0047396 A1* | 2/2013 | Au | B23Q 17/22 29/700 |
| 2020/0329181 A1 | 10/2020 | Lee et al. | |

* cited by examiner

*Primary Examiner* — John C Kuan
(74) *Attorney, Agent, or Firm* — OSTROLENK FABER LLP (57) ABSTRACT

To align an optical module to an image sensor module comprising at least an image sensor, a test image is received with a reference optical element along a first reference optical path, before reflecting the test image along a second reference optical path with the reference optical element towards the image sensor module. An alignment orientation of the image sensor module is first corrected with respect to the reference optical element in order to receive the test image over the second reference optical path onto the image sensor. The reference optical element is subsequently replaced with the optical module. Next, an orientation of the optical module is manipulated such that the second optical path coincides with the second reference optical path so as to optically align the optical module with the image sensor module, before the optical module is finally attached to the image sensor module.

14 Claims, 5 Drawing Sheets

ALIGNING OPTICAL COMPONENTS ALONG A PREDETERMINED REFERENCE OPTICAL PATH

FIELD OF THE INVENTION

The invention relates to a method for aligning optical components, such as an Optical Image Stabilizer (OIS) module and an image sensor module, relative to each other.

BACKGROUND

Imaging modules are commonly used in portable consumer devices such as mobile phones, tablets and notebook computers to provide imaging capabilities. Due to the improvement of technology, higher-quality imaging modules are being used in these portable devices. Therefore, accurate alignment between an optical module and an image sensor module of such imaging modules becomes very important for achieving better image quality during image capturing.

During the assembly of an imaging module, such as that found in a camera for portable consumer devices, it is necessary to align an image sensor of an image sensor module with respect to an optical module providing, for example, image stabilization, in order to achieve the best image quality. Conventionally, the alignment process involves an apparatus which has to make particular assumptions about the orientation of the optical path and the arrangement of the image sensor and the optical module. Such an apparatus may be unsuitable for aligning some imaging modules, and lead to alignment errors.

It would be beneficial to provide an apparatus suited to aligning those imaging modules.

SUMMARY OF THE INVENTION

It is thus an object of this invention to seek to provide a technique which overcomes at least some of the aforementioned problems of the prior art.

According to a first aspect of the present invention, there is provided a method for aligning an optical module relative to an image sensor module comprising at least an image sensor, the method comprising the steps of: receiving a test image with a reference optical element along a first reference optical path and reflecting the test image with the reference optical element along a second reference optical path; manipulating an alignment orientation of the image sensor module to receive the test image over the second reference optical path onto the image sensor and using the test image received by the image sensor to determine a corrected alignment orientation of the image sensor module with respect to the reference optical element, so as to optically align the image sensor module with the reference optical element; replacing the reference optical element with the optical module to be attached to the image sensor module in order to receive the test image with the optical module along the first reference optical path and to reflect the test image with the optical module along a second optical path; manipulating an orientation of the optical module such that the second optical path coincides with the second reference optical path so as to optically align the optical module with the image sensor module; and thereafter fixing the optical module to the image sensor module.

The first aspect recognizes that one problem with aligning an optical module with an image sensor module is that both the image sensor module and the optical module may need to be independently aligned and that the physical arrangement of the optical module and the image sensor module may make performing such alignment difficult. Accordingly, a method is provided. The method may be used to align an optical module relative to an image sensor module. The image sensor module may comprise at least an image sensor. The method may comprise receiving a test image with or at a reference optical element. The test image may be received along a first reference optical path. The method may comprise reflecting or projecting the test image with the reference optical element along a second reference optical path. The method may comprise manipulating or adjusting an alignment orientation of the image sensor module to receive the test image over the second reference optical path onto the image sensor. The method may comprise using the test image received by the image sensor to determine a corrected alignment orientation of the image sensor module with respect to the reference optical element, so as to optically align the image sensor module with the reference optical element. The method may comprise replacing or substituting the reference optical element with the optical module to be fixed to the image sensor module. The optical module may receive the test image along the first reference optical path and may reflect or project the test image along a second optical path. The method may comprise manipulating or adjusting an orientation of the optical module such that the second optical path coincides or aligns with the second reference optical path so as to optically align the optical module with the image sensor module.

The method may comprise fixing the optical module to the image sensor module. In this way, the alignment orientation of the image sensor module is first corrected using the reference optical element to align the image sensor module with the second reference optical path and then the optical module is substituted in place of the reference optical element and then the orientation of the optical module is adjusted so that it reflects or projects along the second reference optical path prior to fixing the optical module to the image sensor module. This approach ensures that both the image sensor module and the optical module are optically aligned prior to fixing.

The orientation of the second reference optical path with respect to the first reference optical path may be due to reflection on a reference optional element reflection surface of the reference optical element. Hence, the orientation of the second reference optical path may be fixed in relation to the first reference optical path due to the geometry of the reference optical element.

The first optical path may be generally horizontal and the second optical path may be generally vertical. This allows the optical module to be stacked on the image sensor module.

The method may comprise generating the test image with a test image generator comprising lenses configured to project the test image with an infinite object distance.

The method may comprise recording the corrected alignment orientation of the image sensor module for subsequent use. This allows the image sensor to be re-oriented to the corrected alignment orientation when required.

The method may comprise projecting the test image along the first optical path after reflection of the test image on a reflection surface of a path changer.

The method may comprise calibrating an orientation of the reference optical element to a calibrated reference orientation where a reflection surface of the reference optical element reflection surface is parallel to the reflection surface of the path changer.

The method may comprise calibrating an orientation of the reference optical element to a calibrated reference orientation where an edge of the reference optical element reflection surface is parallel to an edge of the path changer reflection surface.

The reference optical element may comprise a mount having a mount face at its base and the calibration may comprise the step of manipulating the reference optical element until the mount face is oriented horizontally. This provides a convenient approach to correctly orienting the reference optical element.

Manipulating the mount face along the horizontal plane may orientate the reflection surface of the reference optical element to be parallel to the reflection surface of the path changer.

The step of manipulating the reference optical element may comprise gripping the reference optical element with an optical module gripper and actuating the optical module gripper to re-orientate the reference optical element with respect to the horizontal plane.

The method may comprise recording the calibrated reference orientation of the reference optical element for subsequent use. This allows the reference optical element to be re-oriented to the calibrated reference orientation when required.

The method may comprise the step of orienting a reflection surface of the optical module to a home position by activating at least one motor prior to actuating the optical module gripper.

The method may comprise positioning the optical module with respect to the image sensor module at a fixing position along the second optical path prior to actuating the optical module gripper.

The step of manipulating the alignment orientation of the image sensor module may include receiving the image sensor module with an image sensor module station and actuating the image sensor module station to re-orientate the image sensor module with respect to the reference optical element. Hence, moving the image sensor module station causes a corresponding movement of the image sensor module.

The method may comprise actuating the image sensor module station to orientate a surface of the image sensor module to be horizontal for the application of glue to the image sensor module.

The method may comprise moving the image sensor module placed on the image sensor module station to the fixing position and actuating the image sensor module station to orientate the image sensor module to the corrected alignment orientation with the optical module in the corrected alignment orientation before affixing the optical module to the image sensor with the glue that has been applied.

The step of replacing the reference optical element with the optical module to be fixed to the image sensor module may comprise translating the common support so that the optical module is positioned in place of the reference optical element with the calibrated reference orientation.

The reference optical element and the optical module may be coupled to a common support of the optical module gripper and the step of replacing the reference optical element with the optical module to be fixed to the image sensor module comprises translating the common support so that the optical module is positioned in place of the reference optical element.

The step of manipulating the orientation of the optical module may comprise actuating the optical module gripper to re-orientate the optical module with respect to the image sensor module and using the test image received by the image sensor to determine a corrected orientation of the optical module with respect to the image sensor module for optically aligning the optical module with the image sensor module.

The reference optical element and the optical element inside the optical module may comprise at least one of a mirror and a prism.

The image sensor module may comprise an imaging zoom lens and the step of manipulating may occur when the imaging zoom lens is set to an infinity focus position when receiving the test image with the image sensor.

The test image may comprise at least one unique image positioning feature.

The test image may comprise a plurality of positioning features which are different from the unique image positioning feature.

The unique image positioning feature may be centrally-located within the test image and the plurality of positioning features are positioned around the unique image positioning feature.

The unique image positioning feature may comprise a central contrasting area.

The step of using the test image may comprise determining a location of the unique image positioning feature projected on the image sensor and the manipulating may comprise manipulating the orientation to locate the unique image positioning feature at a positioning location on the image sensor.

The positioning the optical module may comprise positioning the optical module with respect to the image sensor module at a fixing position along the second optical path, separated by a gluing distance, prior to actuating the optical module gripper.

The method may comprise recording the corrected orientation of the optical module for subsequent use.

The fixing of the optical module to the image sensor module may comprise applying glue between the optical module and the image sensor module.

The method may comprise moving the image sensor module with the image sensor module gripper to a glue station and applying glue to a surface of the image sensor module to be fixed to a surface of the optical module.

According to a second aspect of the present invention, there is provided an apparatus configured to perform the method according to the first aspect of the present invention.

These and other features, aspects, and advantages will become better understood with regard to the description section, appended claims, and accompanying drawings.

BRIEF DESCRIPTION OF THE DRAWINGS

Embodiments of the present invention will now be described, by way of example only, with reference to the accompanying drawings, in which.

In the drawings, like parts are denoted by like reference numerals.

DETAILED DESCRIPTION

Before discussing embodiments in any more detail, first an overview will be provided. Some embodiments of the invention provide a technique where both an image sensor module and an optical module (such as an image stabilizer module containing a prism) are optically aligned prior to fixing the optical module to the image sensor module. A difficulty with doing this is that both the optical module and the image sensor module contain components that are independently moveable and which affect the optical path, which makes optical alignment difficult. Hence, it can be difficult to reliably determine how to orientate both the optical module and the image sensor module in order to provide the correct optical alignment between the two. Accordingly, a multi-step approach is used to sequentially align these components. First, a reference optical element is used to project a test image along a reference optical path. This reference optical path has a known and desired orientation and allows the image sensor module to be correctly oriented to align with that reference optical path where the test image is received by the image sensor module along the reference optical path. This fixes the optical alignment of the image sensor module. Now that the correct alignment orientation of the image sensor module is fixed, the reference optical element can be removed and an optical module to be fixed to the image sensor module is put in its place. The image sensor module remains in the correct alignment orientation and this means that the orientation of the optical module can be adjusted so that the test image is once again received by the sensor module along the reference optical path. Once that occurs, then both the image sensor module and the optical module have been correctly oriented to be optically aligned. The image sensor module and the optical module can then be fixed to each other.

Optical Alignment Apparatus

Figure 1:
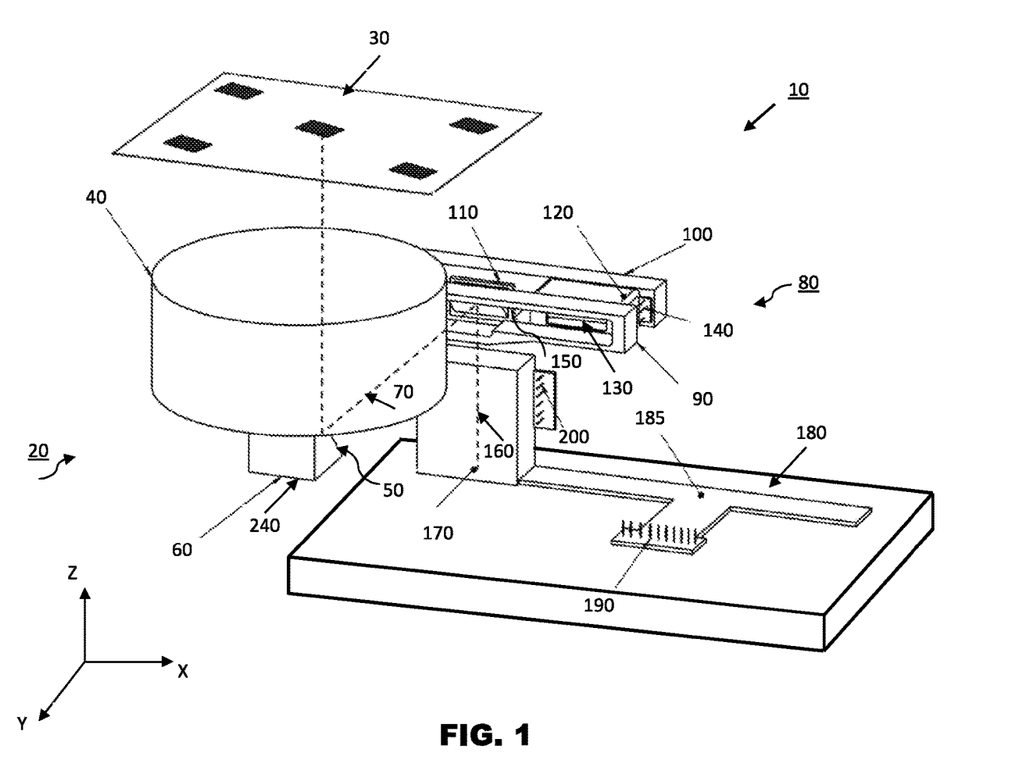
FIG. 1 illustrates the main components of an optical alignment apparatus according to one embodiment.

FIG. 1 illustrates an optical alignment apparatus 10 according to one embodiment. The optical alignment apparatus 10 has a relay lens system 20 which transmits a test image comprising an image of a horizontally-oriented test chart 30, the test image being projected onto a main lens assembly unit 40 and onto a reflective surface 50 of a prism 60. The relay lens system 20 is, in this example, configured to project the image of the test chart 30 generally vertically initially to the reflective surface 50 which then projects the test image along a first reference optical path 70 which, in this example, is oriented generally horizontally.

An optical module gripper 80 is provided which is moveable and rotatable with six degrees of freedom. That is to say, it is moveable and rotatable along and about the horizontal and vertical planes as well as a plane perpendicular to both of those planes. The optical module gripper 80 has a pair of gripper arms 90, 100 which retain a reference optical element 110, in this example a 45° prism which is in a fixed spatial configuration with respect to the gripper arms 90, 100, as mentioned in more detail below. The gripper arms 90, 100 also releasably retain an optical module in the form of an image stabilizer module 120 which houses an optical element 130, in this example a prism, as well as actuators (not shown) which are operable to spatially move the optical module with respect to the image stabilizer module 120 in response to signals provided via electrical connectors such as pogo pins 140.

As can be seen in FIG. 1, a reflective surface 150 of the reference optical element 110 receives the image of the test chart 30 along the first reference optical path 70 and projects the same along a second reference optical path 160 which, as will be explained in more detail below, is calibrated to be oriented vertically.

An image sensor module 170 is mounted in a fixed position on an image sensor module station 180. The image sensor module station 180 is also moveable and rotatable with six degrees of freedom. That is to say, it is moveable and rotatable along and about the horizontal and vertical planes as well as a plane perpendicular to both of those planes. The image sensor module 170 houses an image sensor 172 (illustrated in FIG. 5) as well as a tele-lens unit 174 (see FIG. 5) acting as an imaging zoom lens. The tele-lens unit 174 is displaceable with respect to the image sensor 172 to provide for mechanical optical zoom of images that are received by the image sensor module 170. The optical alignment of the tele-lens unit 174 with respect to the image sensor 172 is performed as set out in US2020/0329181A1, the entire contents of which are incorporated herein by reference. The image sensor module 170 is operatively connected to an image sensor signal connector pad 190 'by way of a flexible printed circuit (FPC) 185. The image sensor module 170, FPC 185 and image sensor signal connector pad 190 are loaded as a single component onto the image sensor module station 180. The image sensor signal connector pad 190 operates to receive and transmit images imaged by the image sensor 172. The image sensor module 170 has a tele-lens unit auto-focus motor connector pad 200 which operates to transmit signals to control the operation of the tele-lens unit 174 within the image sensor module 170. The position of the tele-lens unit 174 may be set to an infinity focus position when receiving the test image with the image sensor 172.

Figure 2:
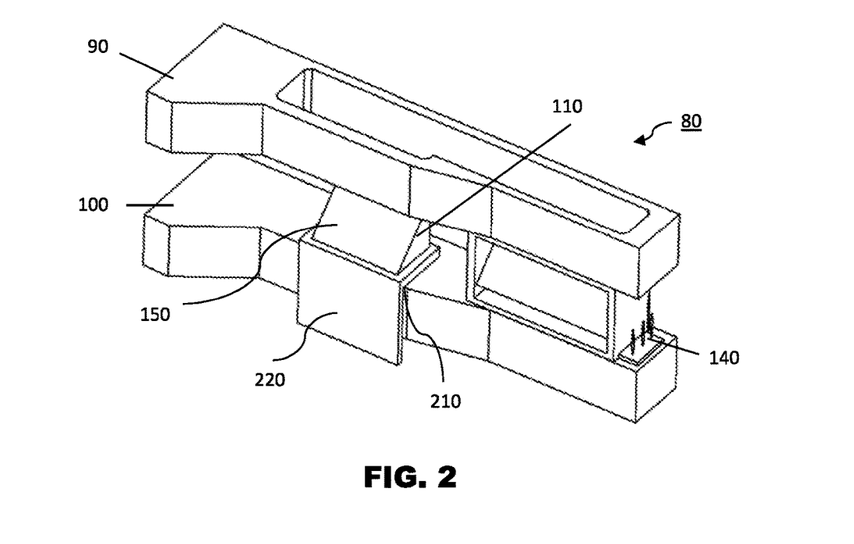
FIG. 2 illustrates components of the optical module gripper on a bottom surface of the optical module gripper in more detail.

FIG. 2 illustrates components of the optical module gripper 80 in more detail. The optical module gripper 80 has been flipped on its side to show components on a bottom surface of the optical module gripper. In particular, it can be seen that the reference optical element 110 is mounted on the gripper arm 100 using a mount 210. The mount 210 has a mount face 220 located at a base of the optical module gripper 80 which is used to calibrate the orientation of the reference optical element 110, as will be explained in more detail below.

Reference Optical Element Calibration

Figure 3:
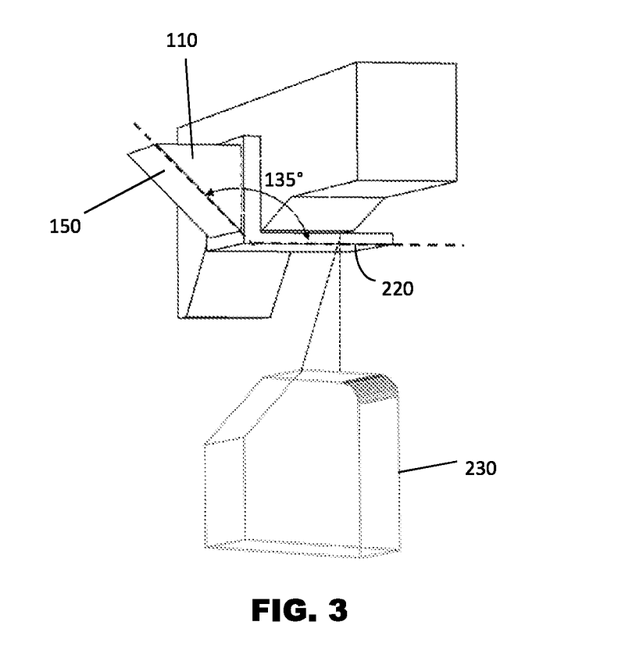
FIG. 3 illustrates an exemplary technique for calibrating the orientation of a reference optical element.

FIG. 3 illustrates an exemplary technique for calibrating the orientation of the reference optical element 110. As can be seen, the mount face 220 is configured to be generally horizontal when the reflective surface 150 of the reference optical element is at 45° to the horizontal plane. This enables the reference optical element 110 to be oriented to a calibrated reference orientation which ensures that the reflective surface 150 receives the image of the test chart 30 horizontally along the first reference optical path 70, and projects the test image vertically along the second reference optical path 160.

Orienting the reference optical element 110 to the calibrated reference orientation is achieved by using a laser measuring device 230 located on a horizontal surface which is arranged on a horizontal plane and takes distance measurements at different positions on the mount face 220. Typically, three or more measurements are taken and those measurements are used to determine whether a reorientation of the optical module gripper 80 is necessary to reduce a difference between those measurements. When the laser measuring device 230 records at least three matching measurements at different locations on the mount face 220, then the mount face 220 would be oriented in the horizontal plane which ensures that the reflective surface 150 is in the correct orientation, which is at 45° to the horizontal plane and parallel to the reflective surface 50. It will be appreciated that a similar technique can be used to calibrate the orientation of the relay lens system 20 by taking measurements from the base 240 of the prism 60, to ensure that the base 240 of the prism 60 is oriented on a horizontal plane.

Figure 4:
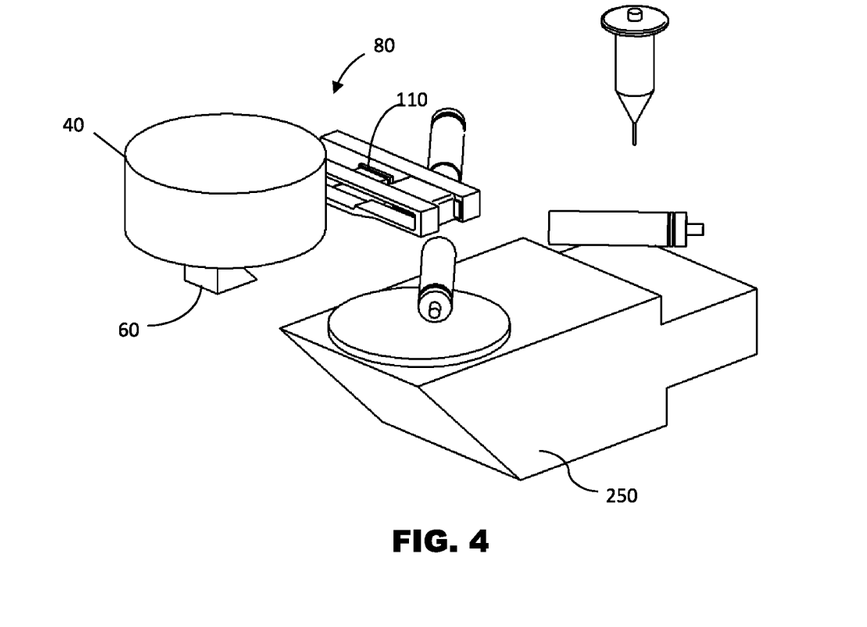
FIG. 4 illustrates using a look-up camera to image a prism and the reference optical element to assist with alignment.

As shown in FIG. 4, a look-up camera 250 can be used to image the facing edges of the prism 60 and the reference optical element 110 to ensure that they are spatially aligned and parallel with each other. The optical module gripper 80 can be moved and/or re-oriented to ensure that the facing edges of the prism 60, and the reference optical element 110 are spatially aligned and parallel with each other and the measurements can again be repeated with the laser measuring device 230. This process can be repeated until the mount face 220 is oriented in the horizontal plane and the facing edges of the prism 60 and the reference optical element 110 are spatially aligned and parallel with each other. The resultant position and orientation of the optical element gripper 80 is recorded on the optical alignment apparatus as a calibrated reference orientation.

Hence, following this calibration, the image of the test chart 30 can be projected vertically through the main lens assembly unit 40 and reflected horizontally along the first reference optical path 70 where it is received by the reference optical element 110 (which is correctly positioned and oriented with the calibrated reference orientation) which, in turn, reflects the test image vertically along the second reference optical path 160 and onto the image sensor module 170.

Image Sensor Module Calibration

Figure 5:
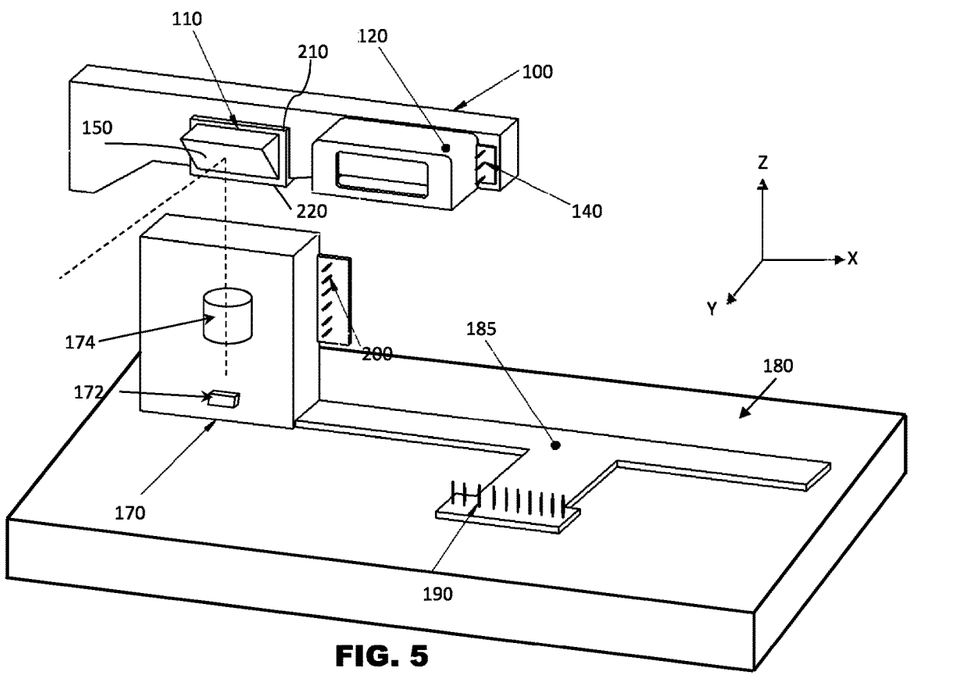
FIG. 5 illustrates positioning an image sensor module below the reference optical element.
Figure 10:
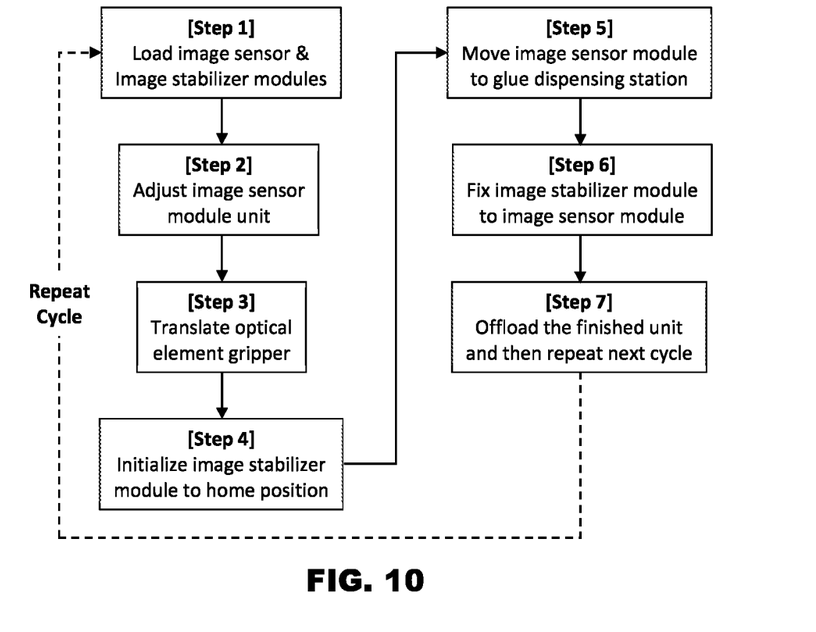
FIG. 10 is an exemplary method for aligning and fixing the image sensor module to the image stabilizer module.

As discussed above, the image sensor 172 and tele-lens unit 174 within the image sensor module 170 are already optically aligned. Turning now to FIG. 10, at step 1, the image sensor module 170 (together with the FPC 185 and image sensor signal connector pad 190) is loaded onto the image sensor module station 180 and the image stabilizer module 120 is loaded into the optical module gripper 80. As shown in FIG. 5, the image sensor module 170 is positioned below the reference optical element 110 by the image sensor module station 180. The tele-lens unit autofocus motor connector pad 200 is used to power the autofocus motor of the tele-lens unit 174, the image sensor signal connector pad 190 is used to power on the image sensor 172 and the pogo pins 140 are used to power on the motor of the image stabilizer module 120. The test image projected by the reference optical element 110 can be captured using the image sensor 172 and conveyed over the image sensor signal connector pad 190.

Returning to FIG. 10, at step 2, from these captured images, the actual view direction of the tele-lens unit 174 can be determined and if there is any error and the test image does not correctly fall on the image sensor 172 (for example, the test chart center pattern is not located at the image sensor center pixel correctly) then suitable adjustments can be made to the alignment orientation of the image sensor module 170 by moving and/or re-orienting the image sensor module station 180 to correctly align the image sensor module 170 with the second reference optical path 160. The position and alignment orientation of the image sensor module station 180 is recorded on the optical alignment apparatus as a correct alignment orientation of the image sensor module.

Now that the image sensor module 170 has been aligned with the second reference optical path 160, the process of orienting and then bonding the image stabilizer module 120 on to the image sensor module 170 can commence.

Image Stabilizer Module/Image Sensor Module Alignment

Figure 6:
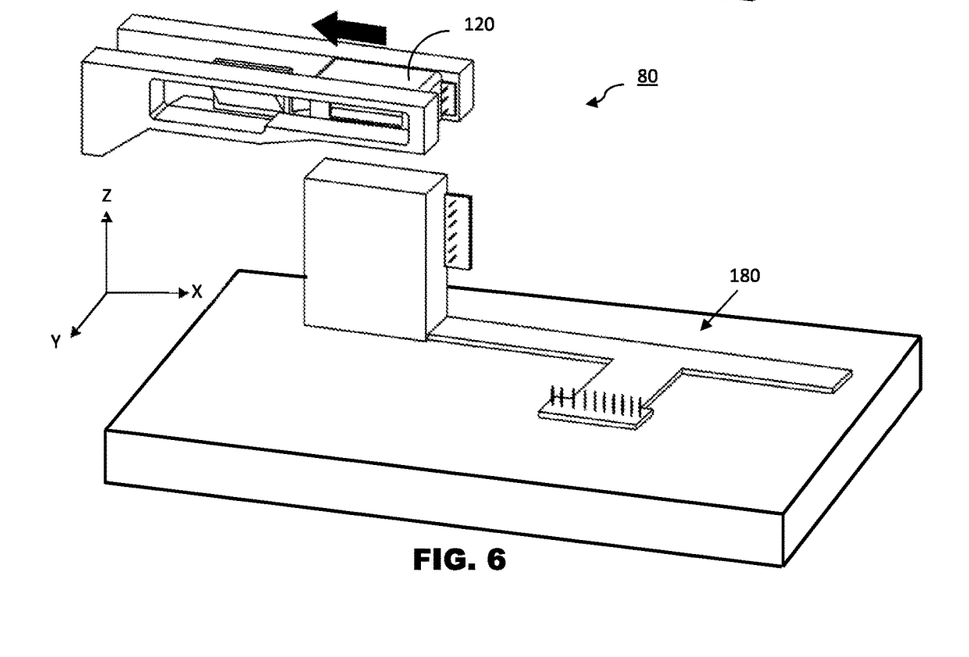
FIG. 6 illustrates translating the optical module gripper to replace the reference optical element with an image stabilizer module.

At step 3, the optical module gripper 80 is translated along the X axis while retaining the image sensor module 170 in its corrected alignment orientation, as shown in FIG. 6. This positions the image stabilizer module 120 in the place of the reference optical element 110.

Figure 7:
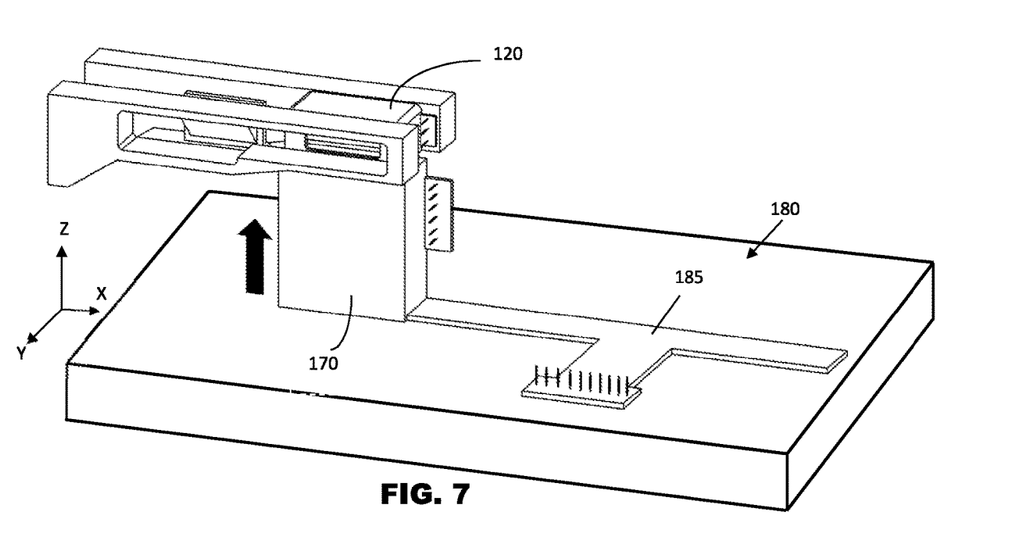
FIG. 7 illustrates translating the image sensor module along the Z-axis to a position it below the image stabilizer module.

Next, as shown in FIG. 7, the image sensor module 170 is translated by the image sensor module station 180 upwards along the Z-axis to a position just below the image stabilizer module 120. The image sensor module 170 and the image stabilizer module 120 remain separated by a distance which allows for a slight reorientation of the image stabilizer module 120.

Returning to FIG. 10, at step 4, the motors of the image stabilizer module 120 are initialized and moved to a home position on all motor channels by supplying signals over the pogo pins 140. Once the optical element 130 is in the home position then the image of the test chart 30 projected by the optical element 130 into the image sensor module 170 is imaged by the image sensor 172. Suitable compensations for any errors in the view direction caused by misalignment of the optical element 130 can be checked by looking at the image of the test chart 30 captured by the image sensor 172 provided via the image sensor signal connector pad 190. Should there be any difference between the image being captured by the image sensor 172 and the image previously provided by the reference optical element 110, then it can be concluded that the optical element 130 in its initial home position is not oriented to exactly match the orientation of the reference optical element 110. Thus, the optical module gripper 80 needs to re-orientate the optical element 130 to make a suitable correction in order to compensate for this error. This compensation process can be repeated until the captured image of the test chart 30 matches the captured image from the reference optical element 110 meaning that the reference optical element 110 is now correctly oriented to receive the image of the test chart 30 over the (horizontal) first reference optical path 70 and reflect the test image 30 over the (vertical) second reference optical path 160 to the image sensor 172.

After aligning the alignment orientation of the image sensor module 170 to the image stabilizer module 120, the image sensor module 170 is moved along the Z-axis to a suitable separation distance away from a bottom surface of the image stabilizer module 120, such that sufficient space is available for the introduction of glue which will be used to fix the image stabilizer module 120 to the image sensor module 170. Hence, the gap should be big enough to let a predetermined volume of glue to be administered between the image stabilizer module 120 and the image sensor module 170. Again, the images provided by the image sensor 172 of the image sensor module 170 are compared with the image recorded in FIG. 5 and the orientation of the optical module gripper 80 is adjusted until the images match. The orientation of the optical module gripper 80 is then recorded.

Image Stabilizer Module/Image Sensor Module Alignment

Figure 8:
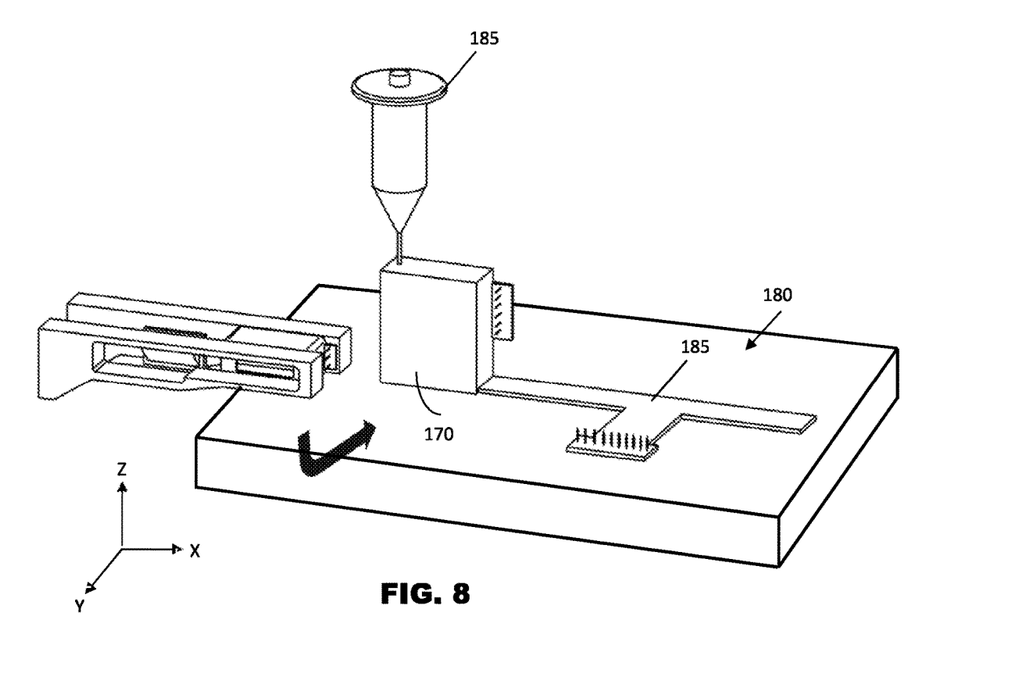
FIG. 8 illustrates moving the image sensor module to a dispensing station for the application of glue.

At step 5, the image sensor module 170 is moved to a glue dispensing station 185 by moving the image sensor module station 180 as shown in FIG. 8. Typically, the image sensor module station 180 is re-oriented to its pre-calibrated position with a top surface of the image sensor module 170 to be located on a horizontal plane to assist in the dispensing of the glue by the glue dispensing station 185. This is because the top surface of the image sensor module 170 should be reasonably flat (i.e. not tilted and should be on a generally horizontal plane) in order to maintain an even distribution of glue during the glue dispensing process.

Figure 9:
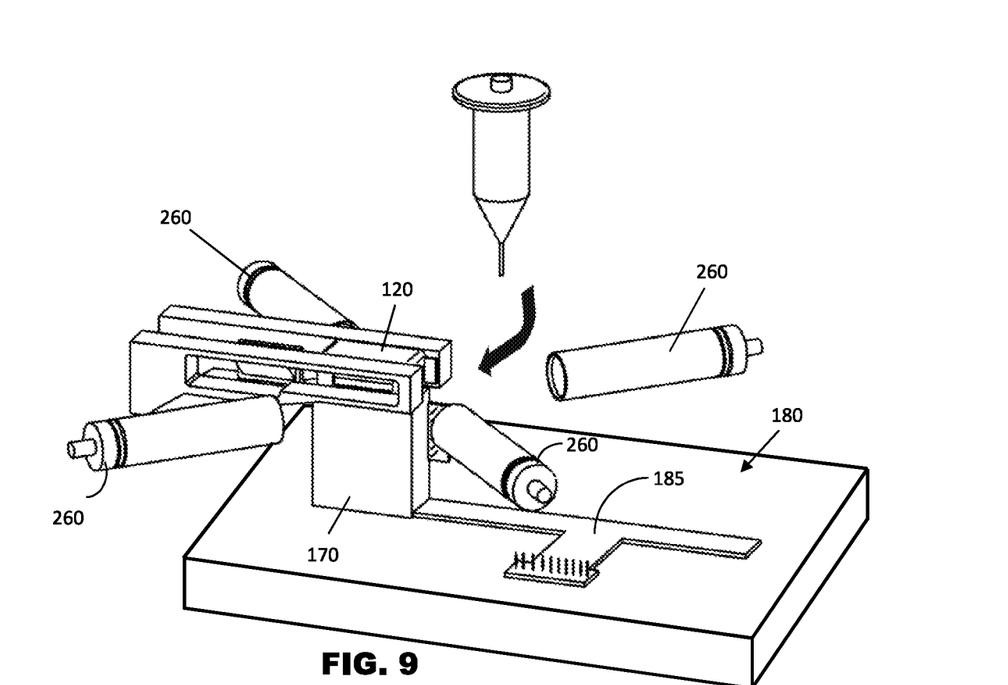
FIG. 9 illustrates moving the image sensor module from the dispensing station to below the image stabilizer module.

Returning to FIG. 10, at step 6, after the glue has been dispensed, and as illustrated in FIG. 9, the image sensor module station 180 is moved back to the position shown in FIG. 7 and re-oriented to the alignment orientation recorded at step 2. The optical module gripper 80 maintains the calibrated reference orientation recorded at step 4. A curing assembly 260 is then activated to cure the glue. In this example, the glue is an ultra-violet (UV) glue which is curable by UV light, and so the curing assembly 260 comprises a number of UV lamps. Once the glue has cured then the image stabilizer module 120 is fixed at the correct position and orientation with respect to the image sensor module 170, and the optical module-gripper 80 can be opened. The combined image stabilizer module 120/image sensor module 170 can then be removed from the image sensor module station 180.

Processing can then return to step 1 where a new image sensor module 170 is located on the image sensor module station 180 and a new image stabilizer module 120 is received by the optical module gripper 80. Steps 2 to 6 are then repeated prior to the combined unit (i.e. the image stabilizer module 120 which is attached to the image sensor module 170) being removed from the image sensor module station 180.

Although the present invention has been described in considerable detail with reference to certain embodiments, other embodiments are possible.

Therefore, the spirit and scope of the appended claims should not be limited to the description of the embodiments contained herein.

The invention claimed is:

1. A method for aligning an optical module relative to an image sensor module comprising at least an image sensor, the method comprising the steps of:
receiving a test image with a reference optical element along a first reference optical path and reflecting the test image with the reference optical element along a second reference optical path;
manipulating an alignment orientation of the image sensor module to receive the test image over the second reference optical path onto the image sensor and using the test image received by the image sensor to determine a corrected alignment orientation of the image sensor module with respect to the reference optical element, so as to optically align the image sensor module with the reference optical element;
replacing the reference optical element with the optical module to be fixed to the image sensor module in order to receive the test image with the optical module along the first reference optical path and to reflect the test image with the optical module along a second optical path;
manipulating an orientation of the optical module such that the second optical path coincides with the second reference optical path so as to optically align the optical module with the image sensor module; and thereafter fixing the optical module to the image sensor module.

2. The method of claim 1, further comprising the step of projecting the test image along the first optical path only after reflection of the test image on a reflection surface of a path changer.

3. The method of claim 2, further comprising calibrating an orientation of the reference optical element to a calibrated reference orientation where a reflection surface of the reference optical element is parallel to the reflection surface of the path changer.

4. The method of claim 3, wherein said reference optical element comprises a mount having a mount face at its base and the calibration comprises the step of manipulating the reference optical element until the mount face is oriented along a horizontal plane.

5. The method of claim 4, wherein the step of manipulating the reference optical element comprises gripping the reference optical element with an optical module gripper and actuating the optical module gripper to re-orientate the reference optical element with respect to the horizontal plane.

6. The method of claim 5, further comprising the step of orienting a reflection surface of the optical module to a home position by activating at least one motor prior to actuating the optical module gripper.

7. The method of claim 5, further comprising the step of positioning the optical module with respect to the image sensor module at a fixing position along the second optical path prior to actuating the optical module gripper.

8. The method of claim 1, wherein the step of manipulating the alignment orientation of the image sensor module comprises receiving the image sensor module with an image sensor module station and actuating the image sensor module station to re-orientate the image sensor module with respect to the reference optical element.

9. The method of claim 8, further comprising actuating the image sensor module station to orientate a surface of the image sensor module to be on a horizontal plane for the application of glue to the image sensor module.

10. The method of claim 9, further comprising the step of moving the image sensor module with the image sensor module station to the fixing position and actuating the image sensor module station to orientate the image sensor module to the corrected alignment orientation while the optical module is in the corrected orientation before affixing the optical module to the image sensor with the glue that has been applied.

11. The method of claim 1, wherein the reference optical element and the optical module are coupled to a common support of the optical module gripper and the step of replacing the reference optical element with the optical module to be fixed to the image sensor module comprises translating the common support so that the optical module is positioned in place of the reference optical element.

12. The method of claim 11, wherein the step of manipulating the orientation of the optical module comprises actuating the optical module gripper to re-orientate the optical module with respect to the image sensor module and using the test image received by the image sensor to determine a corrected orientation of the optical module with respect to the image sensor module for optically aligning the optical module with the image sensor module.

13. The method of claim 1, wherein the reference optical element and the optical module comprise at least one of a mirror and a prism.

14. The method of claim 1, wherein the image sensor module comprises an imaging zoom lens, and the step of manipulating the alignment orientation of the image sensor module occurs when the imaging zoom lens is set to an infinity focus position when receiving the test image with the image sensor.

* * * * *